Sept. 21, 1965 R. R. LOVE 3,207,972

THREE-PHASE GENERATOR

Filed July 6, 1962 2 Sheets-Sheet 1

INVENTOR.
ROGER R. LOVE

BY

Dean, Fairbank & Hirsch
ATTORNEYS

THREE-PHASE GENERATOR

Filed July 6, 1962 2 Sheets-Sheet 2

INVENTOR.
ROGER R. LOVE
BY
Dean, Fairbank & Hirsch
ATTORNEYS

United States Patent Office 3,207,972
Patented Sept. 21, 1965

3,207,972
THREE-PHASE GENERATOR
Roger R. Love, Florham Park, N.J., assignor to NJE Corporation, Kenilworth, N.J., a corporation of New Jersey
Filed July 6, 1962, Ser. No. 207,986
7 Claims. (Cl. 321—5)

This invention relates to the art of alternating current generators and more particularly to a generator for providing three single-phase output signals spaced 120 degrees apart.

As conducive to an understanding of the invention, it is noted that where a three-phase power output is required to operate electrical equipment such as a three-phase motor, for example, servo-systems, syncro-systems and the like and a D.C. source is available which is first converted into three alternating current sources and thereafter such three A.C. sources are set into proper phase, by means of a ring counter, the system is complicated, costly and by reason of the numerous parts employed is subject to breakdown.

Where a phase shift oscillator is used to provide the three-phase output, precise tolerances must be maintained in the components used in the phase shift oscillator, which tolerances are difficult to maintain over wide temperature variations, leading to improper phase shafting and hence improper functioning of the equipment controlled.

It is accordingly among the objects of the invention to provide an equipment that will provide three single-phase output signals separated 120 degrees apart, from a D.C. input, which equipment requires relatively few inexpensive conventional components which may readily be assembled at relatively low cost, which does not involve the need of precise tolerances, which will operate over a wide temperature and frequency range without phase shift and which is not likely to become deranged even with long use.

According to the invention, these objects are accomplished by the arrangement and combination of elements hereinafter described and more particularly recited in the claims.

Figure 1:
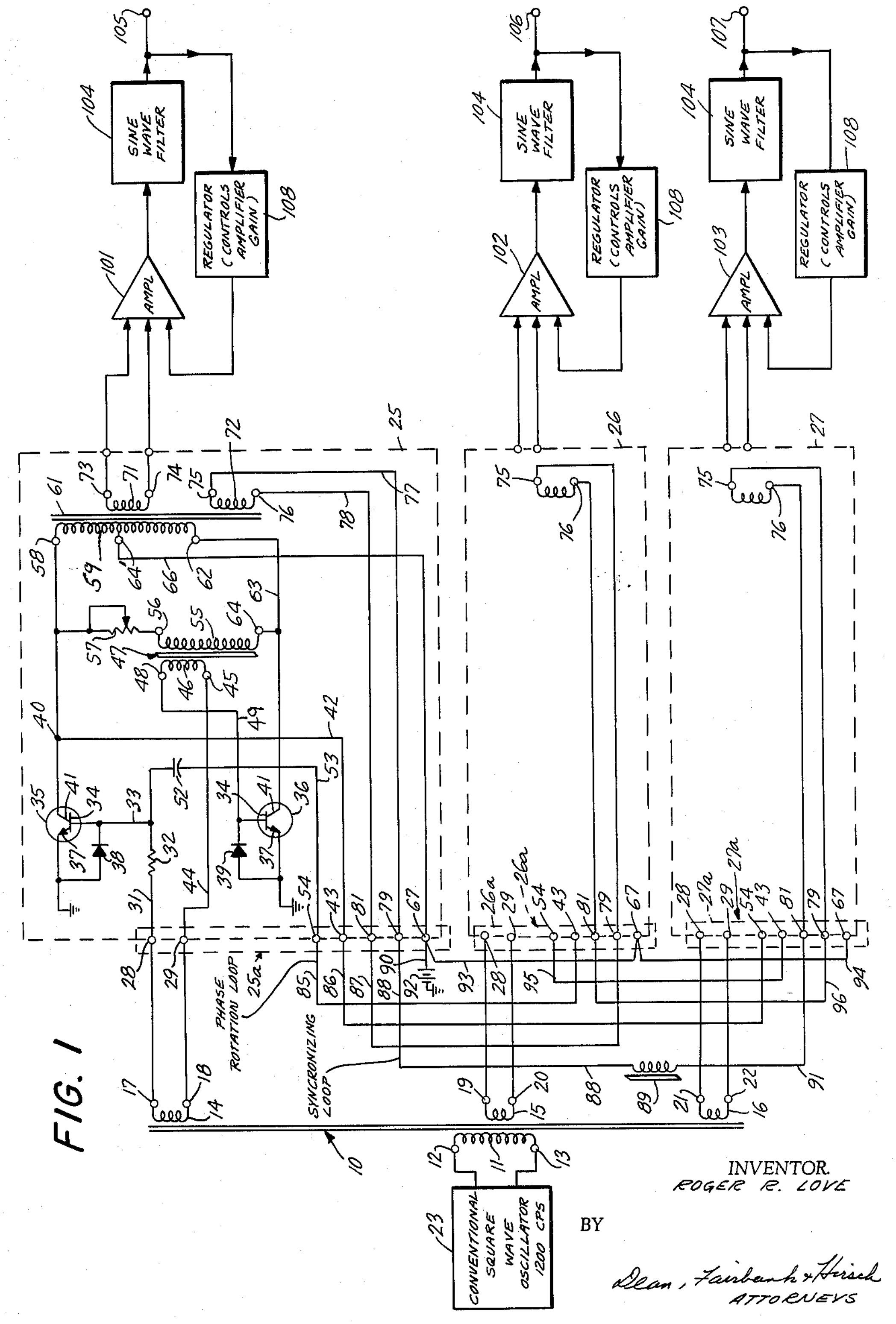
Figure 2:
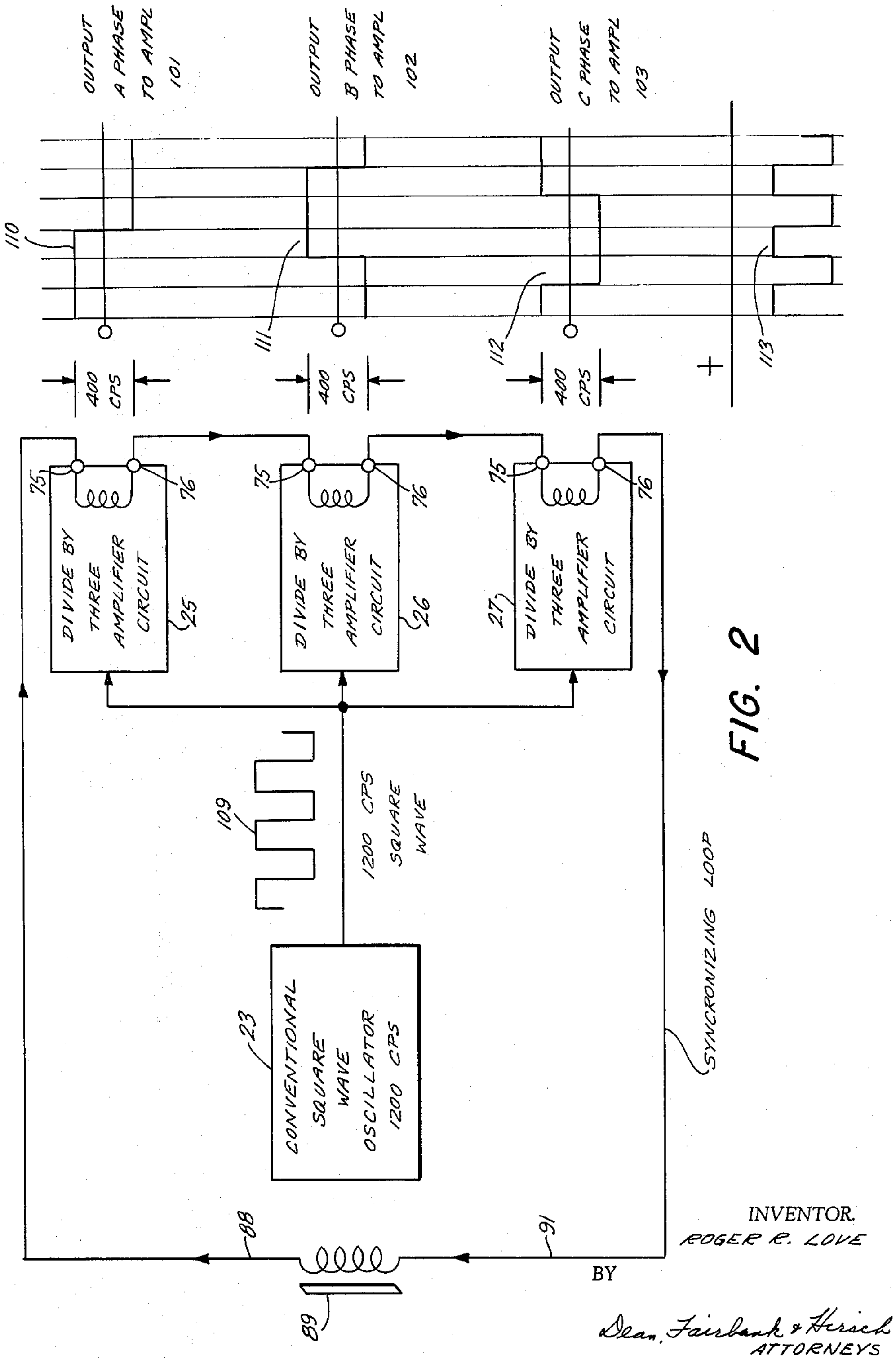

In the accompanying drawings in which is shown one of various possible embodiments of the several features of the invention, FIG. 1 shows a diagrammatic view of one embodiment of the invention, and FIG. 2 is a block diagram of the equipment showing the synchronizing loop.

Referring now to FIG. 1 of the drawings, the equipment comprises an isolation transformer 10 having a primary winding 11 with a pair of input terminals 12 and 13 and three secondary windings 14, 15 and 16, each having a pair of terminals 17, 18; 19, 20; 21, 22 respectively.

Connected to the input terminals 12 and 13 of the primary winding 11 of transformer 10 is a conventional square wave oscillator 23 which illustratively has a frequency of 1,200 cycles per second inasmuch as the output of the system is designed to provide 400 cycles per second.

Connected to each pair of the terminals of secondary windings 14, 15 and 16 is a frequency divider and amplifier unit 25, 26 and 27.

As these units are identical, only the unit 25 will be described.

Referring to FIG. 1, the terminal 17 of primary winding 14 is connected to terminal 28 of unit 25 which in turn is connected by lead 31 to one end of base limiting resistor 32, the other end of which is connected by lead 33 to the base 34 of amplifier transistor 35, illustratively of the NPN type. The transistor 35 forms part of a push-pull amplifier which has a second NPN transistor 36 associated therewith, the emitters 37 of transistors 35, 36 being connected to ground and to the anodes of diodes 38, 39 and from the cathodes of said diodes back to the bases 34 of said transistors.

The collector 41 of transistor 35 is connected to junction 40 and thence by lead 42 to terminal 43 of unit 25. The terminal 18 of secondary winding 14 is connected to terminal 29 of unit 25 which in turn is connected by lead 44 to terminal 45 of the secondary winding 46 of a transformer 47 which is a blocking transformer, the other terminal 48 of secondary winding 46 being connected by lead 49 to the base 34 of transistor 36 of the pust-pull amplifier. The base 34 of transistor 35 of said push-pull amplifier is connected by lead 33 through coupling capacitor 52 and lead 53 to terminal 54 of unit 25.

The primary winding 55 of transformer 47 has one of its terminals 56 connected through phase shift trim potentiometer 57 to junction 40 and also to terminal 58 of the primary winding 59 of drive transformer 61. The other end 62 of the primary winding 59 of transformer 61 is connected by lead 63 to the terminal 64 of the primary winding 55 of blocking transformer 47 and also to the collector 41 of transistor 36 of the push-pull amplifier. The primary winding 59 of transformer 61 has a center tap terminal 64' which is connected by lead 66 to terminal 67 of unit 25.

The drive transformer 61 has two secondary windings 71 and 72. The winding 71 is the drive output winding to the final amplifier and has terminals 73 and 74. The secondary winding 72 is the synchronizing winding and has terminals 75 and 76 which are connected by leads 77 and 78 respectively to terminals 79 and 81 of unit 25.

Each of the units 25, 26 and 27 has a terminal strip **25*a*, 26*a* and 27*a* associated therewith, each of said terminal strips mounting the terminals 28, 29, 54, 43, 81, 79 and 67** respectively.

Referring to FIG. 1, the terminal 54 of terminal strip **25*a* is connected by lead 85 to terminal 43 of terminal strip 26*a*. The terminal 43 of terminal strip 25*a*, to which lead 42 of unit 25 is connected, is connected by lead 86 to terminal 54 of terminal strip 27*a* to which lead 53 of unit 27** is connected.

Terminal 81 of terminal strip **25*a* to which lead 78 of unit 25 is connected, is connected by lead 87 to terminal 79 of terminal strip 26*a* to which lead 77 of unit 26** is connected.

Terminal 79 of terminal strip **25*a* to which lead 77 of unit 25 is connected, is connected by lead 88 to one end of synchronizing choke 89, the other end of which is connected by lead 91 to terminal 81 of terminal strip 27*a*, to which lead 78 of unit 27 is connected. Terminal 67 of terminal strip 25*a* to which lead 66 of unit 28 is connected, is connected by lead 90 to the positive side of battery 92, the negative side of which goes to common ground. In addition, the terminals 67 of terminal strips 26*a* and 27*a* are also connected by leads 93, 94 to the positive side of battery 92. Terminal 54 of terminal strip 26*a*, to which lead 53 from unit 26 is connected, is connected by lead 95 to terminal 43 of unit 27**.

Terminal 81 of unit 26 to which lead 78 of unit 26 is connected, is connected by lead 96 to terminal 79 of terminal strip **27*a***.

The output from the secondary winding 71 of driver transformer 61 is connected to the input of an amplifier 101 and the corresponding outputs from the secondary windings 71 of units 26 and 27 are also connected to the inputs of associated amplifiers 102, 103. The output of each of the amplifiers 101, 102, 103 goes to a conventional sine wave filter 104 which makes a low distortion since wave from the amplified output from the associated amplifier. The output of the sine wave filter 104 goes to an associated output terminal 105, 106, 107 and a portion of such output is fed back in conventional manner to an associated regulator 108 of conventional type, the output of said regulator feeding back into the associated amplifier 101, 102, 103 to control the gain of such amplifier so that the output from terminals 105, 106, 107 will be maintained within predetermined limits.

*Operation*

The purpose of the equipment above described, is to provide three single-phase output signals separated 120 degrees apart, synchronized with the single square wave oscillator 23, which outputs will be converted from the D.C. voltage provided by the battery 92.

When the equipment is initially turned on, the square wave oscillator 23 will illustratively provide square waves at a frequency of 1,200 cycles per second to the primary winding 11 of transformer 10. A corresponding square wave will appear across each of the secondary windings 14, 15 and 16 of transformer 10, such secondary windings giving a low voltage isolated drive signal to the three frequency dividers 25, 26 and 27.

At the same time a D.C. voltage is applied from the battery 92 to the center tap 64' of the primary windings 59 of each of the transformers 61 in units 25, 26 and 27.

The 1,200 cycle per second low voltage isolated drive signal from the terminal 17 of the secondary winding 14 of transformer 10 is applied to the frequency divider unit 25 through lead 31, base limiting resistor 32, base 34 of transistor 35, through the emitter 37 thereof to ground and from ground through the diode 39, lead 49, through the secondary winding 46 of transformer 47, lead 44, terminal 29 back to terminal 18 of secondary winding 14. Diodes 38 and 39 thus provide a current path around the amplifier transistors 35 or 36 when either is in a nonconducting mode.

As soon as the leading edge of the square wave signal applied to the base of transistor 35 has risen sufficiently to effect conduction of said transistor, the amplified signal from the collector 41 of transistor 35 will develop a voltage across the primary winding 59 of transformer 61. This voltage is applied across the primary winding 55 of blocking transformer 47. As a result, it will induce a bucking voltage across the secondary winding 46 of transformer 47 which will swamp the original 1,200 cycle input signal from the winding 14 so that the latter will not longer have any effect.

Thus, the action above described allows only the leading edge of the 1,200 cycle signal from the winding 14 to be applied to the base 34 of the transistor 35.

The transformer 47 is a saturating type of transformer of conventional type and it will support the primary voltage from the primary winding 55 for slightly less than one-half cycle of 400 cycles per second. When the primary voltage across winding 55 collapses near the end of the first cycle, the secondary voltage across winding 46 will collapse simultaneously.

When the secondary winding voltage 46 collapses, it can no longer buck out or swamp the 1,200 cycle per second drive signal from winding 14 to the amplifier transistors 35 or 36, depending upon the mode of operation. Hence, such 1,200 cycle drive signal must pass through secondary winding 46. Secondary winding 46 now only presents a low D.C. resistance (wire resistance of the secondary winding 46) to the 1,200 cycle per second drive signal. Therefore, the drive signal again has control of the switching amplifiers 35 and 36. At the one-half cycle point, the 1,200 cycle drive signal from winding 14 switches transistors 35 and 36 into the last half cycle mode of operation.

The voltage across the primary winding 55 of blocking transformer 47 reverses due to the reversal of current through the primary winding 59 of transformer 61 which again is due to the amplifier transistor 35 and 36 reversing their conducting modes. When the voltage across primary winding 55 of blocking transformer 47 reverses, the primary winding 55 will again support voltage due to the reversal of magnetic flux taking the transformer out of saturation. This again produces a secondary voltage which blocks the 1,200 cycle per second input signal for something less than a half cycle of the 400 cycle output.

The above operation happens in all three frequency dividers 25, 26 and 27. The potentiometer 57 controls the voltage applied to the primary winding 55 of transformer 47 and therefore controls the saturation time of said transformer. If the voltage applied to the primary winding 55 is increased, the saturation time decreases (this is well known as the volt second ratio that a particular transformer will support).

The object of the present invention is to have the outputs of the three frequency dividers 25, 26 and 27 shifted in phase with respect to each other. With the circuit thus far described, since the frequency dividers will all be triggered in the same phase (i.e., by the same leading edge of the same 1,200 cycle signal) the outputs would not be shifted 120 degrees with respect to each other. As previously described, the transformer 61 has two secondary windings 71 and 72. The winding 71 is the drive winding and the winding 72 is the synchronizing winding. The secondary windings 72 of the transformers 61 of units 25, 26 and 27 are connected in series with each other through the synchronizing choke 89 as can clearly be seen from FIG. 1.

Thus referring to FIG. 2, the reference numerals 110, 111 and 112 indicate the 400 cycle output respectively from each of the units 25, 26 and 27 when the latter are operating in their proper synchronized manner. The reference numeral 113 refers to the sum of these three 400 cycle outputs, which sum is a 1,200 cycle output which is applied across the synchronizing choke 89. Thus, due to the individual 400 cycle voltages across each of the secondary windings 72 of the three units 25, 26 and 27, a 1,200 cycle voltage will be developed across the choke 89.

The synchronizing choke 89 is designed to saturate, i.e. (to fail to support the voltage and hence to collapse), at a frequency slightly less than 1,200 cycles per second. In normal operation the only current that will flow in the loop, consisting of the secondary winding 72 of units 25, 26 and 27 and choke 89 is the exciting current through the choke 89. This current is of very low magnitude and can readily be supplied by the three secondary windings 72.

If the three frequency dividers 25, 26 and 27 are operating in desired phase as shown by their voltage wave forms 110, 111 and 112, the system is in synchronization and the frequency of the voltage across choke 89 will be 1,200 cycles per second. If any one of the three wave forms 110, 111 and 112 is out of their proper phase position, i.e. not 120 degrees apart, the sum total which will be indicated by the wave form 113 will not be 1,200 cycles per second, but some lower frequency.

When a frequency lower than 1,200 cycles per second is applied to the synchronizing choke 89 it will saturate due to the lower frequency applied. After saturation, the choke 89 will not support any voltage, and only the wire resistance of the choke will be present. This wire resistance is very low and therefore the choke 89 will now draw a large amount of current which must be supplied by the units 25, 26 and 27 in the closed circulating synchronizing loop including the secondary winding 72 of each of the units 25, 26 and 27.

Since the amplifiers are not designed to supply such high current they will not oscillate properly, i.e., the transistors 34, 35 will not turn on and off in equally timed sequence. The three units 25, 26 and 27 will continue to operate improperly until they randomly fall into the proper phase shift position at which time the output will be the proper frequency of 1,200 cycles per second. In operation it has been found that this occurs extremely rapidly, i.e., under one second, which is immaterial in conventional use. It is to be noted that this improper operation only occurs at the beginning of the operation of the equipment, i.e., when it is initially turned on and once the equipment is running it remains locked in synchronized position.

When the equipment again comes into synchronization, the overload on the three frequency divider amplifiers 25, 26 and 27, which is due to the saturization of the choke 89, will disappear at the moment of synchronization and again only the relatively low exciting current for choke 89 will flow in the closed synchronized loop including the secondary winding 72 of each of the units 25, 26 and 27.

Now that the outputs from each of the units 25, 26 and 27 are separated by 120 degrees, it is to be noted that if the wave form 110 was switched with the wave form 112, synchronism would still remain, i.e., the total output would still be 1,200 cycles per second. Thus, there would be improper phase rotation.

Means are provided to insure that when the equipment is operating in synchronization, a proper desired phase rotation will be maintained.

Thus, referring to FIG. 1, the signal taken from the collector 41 of transistor 35, for example, when the latter is conducting, is applied to the base 34 of the preceding unit. Thus, assuming that we are referring to the unit 25, the signal from the collector 41 of the transistor 35 of unit 25 will be applied to the base 34 of transistor 35 of unit 27. This signal will be applied to the base 34 through the coupling capacitor 52 which permits only the A.C. signal to pass. So long as the phase rotation is proper, the signals applied to the bases of all three of the frequency divider units 25, 26 and 27 is applied when the associated amplifier transistor 35 is in the conducting mode. Therefore, the signal taken from the collector 41, if applied to the base of the transistor 35 of the preceding stage, as previously described, at the time when such transistor 35 is already in its conducting mode, the application of such signal has no affect on such conducting transistor. At this time we will assume that the signal is being sent from the transistor 35 of unit 25 to the base 34 of transistor 35 of unit 27, which transistor 35 of unit 27 is not conducting. This signal applied to the base of transistor 35 of unit 27 will cause such transistor to conduct.

We have now reached the condition that each of the three units are supplying a desired 400 cycle output signal and the three output signals are separated by 120 degrees as desired. It is now necessary to insure that when the equipment is started there will always, at each starting time, be a proper phase relationship between the output signals in order that the equipment operated thereby will operate in the proper manner, i.e., that there is proper phase rotation of the driven unit.

Assuming that at time T when all of the units are operating with a proper phase difference of 120 degrees, the output signals are in the proper phase sequence as shown, for example in FIG. 2. Assuming that a square wave signal is being applied to the transistor 35 to cause the latter to conduct, at this same time, referring to FIG. 1, the transistor 35 of unit 27 is presently conducting. Consequently, proper rotation is present. The signal taken from the collector 41 of transistor 35 of unit 25 is applied to the base of transistor 35 of unit 27 through coupling capacitor 52, but as the transistor 35 of unit 27 is already conducting, this has no effect. Assuming, however, that the transistor 35 of unit 27 was not conducting, i.e., that the transistor 35 of unit 26 was conducting, so that the wave forms from the three units would be as shown in FIG. 2 except that the wave form of 111 and 112 would be reversed, there would still be the frequency shift difference between each of the outputs of 120 degrees with a total output of 1,200 cycles per second as the sum, but the phase of rotation is now reversed.

However, since at this time the signal from the collector 41 of transistor 35 of unit 25 is applied to the base of transistor 35 of unit 27, such transistor will now be driven to conduction.

As a result, the sum of the output signals from the three units would now again be less than 1,200 cycles per second so that the synchronizing choke 89 would no longer support the voltage and the voltage would collapse causing the units again to operate in random manner. The equipment would thus operate in this improper manner only for a relatively short period under one second. When the two conditions have been satisfied, i.e., that the phase difference is 120 degrees and that the phase rotation is in the proper direction, at such time only will the total output frequency be 1,200 cycles per second at which time the circuits will operate in normal manner.

It is to be noted that this condition of irregular operation only occurs when the equipment is initially turned on and once the desired stabilized condition is reached, i.e. when the sum of the outputs of the three units 25, 26 and 27 will provide an output frequency of 1,200 cycles per second, the equipment will become stabilized and function in such manner thereafter, this operation occurring in a very small period of time as above set forth.

It is of course within the scope of the invention to eliminate the synchronizing choke and connect the adjacent wires to the terminals 12 and 13 of the transformer 10. It has been found that the starting action is faster with the choke, which is required in some operations, but in cases where fast starting is not required, the choke may be dispensed with.

The equipment above described thus provides a dependable three-phase output with a minimum of components in the phase shifting portion thereof and with assurance that the phase rotation will be in the proper direction.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desired to secure by Letters Patent of the United States is:

1. A three-phase generator comprising three amplifier units, each of said units having an input and an output, means to apply a common alternating current source to each of the inputs, means in each of said amplifiers to provide a signal across said output of frequency substantially equal to one-third that of the applied frequency, each of said amplifier units having an additional output across which the divided frequency signal appears, means connecting said three additional outputs in series to define a closed loop, an inductance of the saturated type in said loop that will present a high resistance when the sum of the alternating current voltages from the additional outputs of each of the units is equal to the applied input frequency to the three units and which will present a low resistance when the sum of such alternating current voltages is less than such input frequency, whereby when such frequency is less than such input frequency, the current drawn through said series connected additional outputs will be substantially increased to overload each of said amplifier units, each of said amplifiers having associated amplifier transistors, said transistors having a maximum current output capability below that of the current load caused when the combined output frequency deviates from the input frequency, whereby said transistors will operate randomly until the sum of the output frequency voltages is equal to the input frequency voltage.

2. The combination set forth in claim 1 in which said inductance comprises a synchronizing choke in series with said additional outputs.

3. The combination set forth in claim 1 in which each of said amplifier units has a pair of transistors, means controlled by said alternating current input alternatively to render one of said transistors conducting and the other non-conducting, said means comprising a transformer having a primary winding and a pair of secondary windings, said primary winding being connected to corresponding elements of said transistors, the output of each of said units being across one of said secondary windings and the additional output being across the other of said secondary windings.

4. The combination set forth in claim 1 in which means are provided to feed a portion of the signal from the transistors in one of said units to the base of the transistor in another of said units, whereby if the transistor in the other of said units is not conducting such signal will affect conduction of such transistor.

5. The combination set forth in claim 1 in which each of said amplifier units comprises a pair of transistors in push-pull arrangement, each transistor having a base, an emitter and a collector, a first transformer having a primary winding and a pair of secondary windings, the output of each of the units being across one of said secondary windings and the additional output being across the other of said secondary windings, the collectors of said transistors of each unit being connected across the primary winding of said transformer, an additional transformer having a primary and a secondary winding, said primary winding being connected in parallel with the primary winding of the first transformer, means connected to the primary winding of said first transformer to apply D.C. potential to the associated amplifier unit, means providing a return current path for said direct current potential from the emitters of said transistors, means to apply an alternating current input signal to the base of one of said transistors and through the secondary winding of said additional transformer to the base of the other transistor, whereby one of the transistors will be conducting and the other cut off on alternate half cycles.

6. The combination set forth in claim 5 in which said primary winding of the first transformer is center tapped and the D.C. potential is applied to said center tap.

7. The combination set forth in claim 5 in which the emitters of said pair of transistors are electrically connected, a diode is connected between the emitter and base of each transistor, said diode having an anode connected to the emitter and a cathode connected to the base.

References Cited by the Examiner

UNITED STATES PATENTS

| | | | |
|---|---|---|---|
| 2,916,687 | 12/59 | Cronin | 321—5 |
| 3,050,674 | 8/62 | Moore | 321—5 |
| 3,060,363 | 10/62 | Jensen | 321—5 |

OTHER REFERENCES

"Static Inverter Delivers Regulated 3-Phase Power," by M. Lilienstein, published in Electronic, vol. 33, No. 28 (July 8, 1960), pages 55–59.

LLOYD McCOLLUM, *Primary Examiner.*